United States Patent [19]
Jones et al.

[11] Patent Number: 5,410,705
[45] Date of Patent: Apr. 25, 1995

[54] METHOD FOR GENERATING AN OBJECT DATA STRUCTURE LAYOUT FOR A CLASS IN A COMPILER FOR AN OBJECT-ORIENTED PROGRAMMING LANGUAGE

[75] Inventors: David T. Jones, Preston; Martin J. O'Riordan, Redmond; Mark J. Zbikowski, Woodinville, all of Wash.

[73] Assignee: Microsoft Corporation, Redmond, Wash.

[21] Appl. No.: 163,846

[22] Filed: Dec. 7, 1993

Related U.S. Application Data

[62] Division of Ser. No. 682,537, Apr. 9, 1991, Pat. No. 5,297,284.

[51] Int. Cl.$^6$ ............................................. G06F 12/00
[52] U.S. Cl. ........................... 395/700; 364/DIG. 1; 364/228.1; 364/280; 364/284
[58] Field of Search ................. 364/DIG. 1, 280, 284, 364/228.1; 395/600, 700

[56] References Cited

U.S. PATENT DOCUMENTS

| Re. 33,706 | 10/1991 | Mohri et al. | 394/900 |
|---|---|---|---|
| 4,525,780 | 6/1985 | Bratt et al. | 395/425 |
| 5,093,914 | 3/1992 | Coplien et al. | 395/700 |
| 5,129,083 | 7/1992 | Cutler et al. | 395/600 |

OTHER PUBLICATIONS

*Turbo C++ Programmers Guide,* Borland International, 1990, pp. 102–130.

Smith, P., "OOP With Pascal," *EXE,* Sep. 1989, v4 n4, p. 18(3).
Ellis, Margaret and Bjarne Stroustrup, *The Annotated C++ Reference Manual,* Addison–Wesley Publishing Company, New York, 1990, Ch. 10, "Derived Classics," pp. 228–237.

*Primary Examiner*—Kevin A. Kriess
*Assistant Examiner*—Jonathan Hall Backenstose
*Attorney, Agent, or Firm*—Seed & Berry

[57] ABSTRACT

A method for a computer compiler for an object-oriented programming language for implementing virtual functions and virtual base classes is provided. In preferred embodiments of the present invention, the data structure layout of an object includes a virtual function table pointer, a virtual base table pointer, occurrences of each non-virtual base class, the data members of the class, and occurrences of each virtual base class. If a class introduces a virtual function member and the class has a non-virtual base class with a virtual function table pointer, then the class shares the virtual function table pointer of the non-virtual base class that is first visited in a depth-first, left-to-right traversal of the inheritance tree. In preferred embodiments of the present invention, each instance of a given class shares a set of virtual function tables and virtual base tables for that class. In preferred embodiments, adjusters are used when a function member in a derived class overrides a function member that is defined in more than one base class, and when a derived class has a base class that overrides a function member in a virtual base class of that class and the derived class itself does not override the function member.

11 Claims, 17 Drawing Sheets

METHOD FOR GENERATING AN OBJECT DATA STRUCTURE LAYOUT FOR A CLASS IN A COMPILER FOR AN OBJECT-ORIENTED PROGRAMMING LANGUAGE

CROSS-REFERENCE TO RELATED APPLICATION

This application is a division of U.S. patent application Ser. No. 07/682,537, filed Apr. 9, 1991, which issued as U.S. Pat. No. 5,297,284 on Mar. 22, 1994.

TECHNICAL FIELD

This invention relates generally to the field of compilers for computer programming languages and more specifically to compilers for languages having object-oriented features.

BACKGROUND OF THE INVENTION

The use of object-oriented programming techniques can facilitate the development of complex computer programs. Programming languages that support object-oriented techniques have been developed. One such programming language is C++.

Two common characteristics of object-oriented programming languages are support for data encapsulation and data type inheritance. Data encapsulation refers to the binding of functions and data. Inheritance refers to the ability to declare a data type in terms of other data types.

In the C++ language, object-oriented techniques are supported through the use classes. A class is a user-defined type. A class declaration describes the data members and function members of the class. For example, the following declaration defines data members and function member of a class named CIRCLE.

```
class CIRCLE
    {   int x, y;
        int radius;
        void draw( );
    };
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a function member of class CIRCLE. The data members and function members of a class are bound together in that the function operates an instance of the class. An instance of a class is also called an object of the class.

In the syntax of C++, the following statement declares the objects a and b to be of type class CIRCLE.

CIRCLE a, b;

This declaration causes the allocation of memory for the objects a and b, such an allocation is called an instance of the class. The following statements assign data to the data members of objects a and b.

a.x=2;

a.y=2;

a.radius=1;

b.x=4;

b.y=5;

b.radius=2;

The following statements are used to draw the circles defined by objects a and b.

a.draw();

b.draw();

A derived class is a class that inherits the characteristics—data members and function members—of its base classes. For example, the following derived class CIRCLE_FILL inherits the characteristics of the base class CIRCLE.

```
class CIRCLE_FILL : CIRCLE
    {   int pattern;
        void fill( );
    };
```

This declaration specifies that class CIRCLE_FILL includes all the data and function members that are in class CIRCLE in addition to the those data and function members introduced in the declaration of class CIRCLE_FILL, that is, data member pattern and function member fill. In this example, class CIRCLE_FILL would have data members x, y, radius, and pattern and function members draw and fill. Class CIRCLE_FILL is said to "inherit" the characteristics of class CIRCLE. A class that inherits the characteristics of another class is a derived class (e.g., CIRCLE_FILL). A class that does not inherit the characteristics of another class is a primary class (e.g., CIRCLE). A class whose characteristics are inherited by another class is a base class (e.g., CIRCLE is a base class of CIRCLE_FILL). A derived class may inherit the characteristics of several classes, that is, a derived class may have several base classes. This is referred to as multiple inheritance.

A derived class may specify that a base class is to be inherited virtually. Virtual inheritance of a base class means that only one instance of the virtual base class exists in the derived class. For example, the following is an example of a derived class with two non-virtual base classes.

class PATTERN: CIRCLE, CIRCLE{ ... };

In this declaration class PATTERN inherits class CIRCLE twice non-virtually. There are two instances of class CIRCLE in class PATTERN.

The following is an example of a derived class with two virtual base classes.

class PATTERN: virtual CIRCLE, virtual CIRCLE{ ... };

The derived class PATTERN inherits class CIRCLE twice virtually. Since the class CIRCLE is virtually inherited twice, there is only one object of class CIRCLE in the derived class PATTERN. This is the simplest use of virtual inheritance and is not particularly useful. One skilled in the art would appreciate virtual inheritance can be very useful when the class derivation is more complex.

A class may also specify whether its function members are to be virtually inherited. Declaring that a function member is virtual means that the function can be overridden by a function of the same name and type in a derived class. In the following example, the function draw is declared to be virtual in classes CIRCLE and CIRCLE_FILL.

```
class CIRCLE
    {   int x, y;
        int radius;
        virtual void draws;
    };
class CIRCLE_FILL : CIRCLE
    {   int pattern;
        virtual void draw( );
    };
```

Continuing with the example, the following statement declares object a to be of type class CIRCLE and object b to be of type class CIRCLE_FILL.

CIRCLE a;

CIRCLE_FILL b;

The following statement refers to the function draw as defined in class CIRCLE.

a.draw();

Whereas, the following statement refers to the function draw defined in class CIRCLE_FILL.

b.draw();

Moreover, the following statements type cast object b to an object of type class CIRCLE and invoke the function draw that is defined in class CIRCLE_FILL.

```
CIRCLE c;
c_ptr *CIRCLE;
c_ptr = &b;
c_ptr—>draw( );   //   CIRCLE_FILL::draw( )
```

Thus, the type casting preserves the call to the overriding function CIRCLE_FILL::draw.

Although object-oriented techniques facilitate the development of complex computer programs, the resulting computer programs can be less efficient in execution speed and require more memory than a program developed without object-oriented techniques. It would be desirable to have method and system for implementing the techniques of object-oriented programming to improve the execution speed and reduce the memory requirements of the computer program.

SUMMARY OF THE INVENTION

It is an object of the present invention to provide improved methods of implementing virtual functions in a compiler for an object-oriented programming language.

It is another object of the present invention to provide improved methods for implementing virtual base classes in a compiler for an object-oriented programming language.

It is another object of the present invention to provide an improved compiler for an object-oriented programming language that reduces the run-time storage requirements for each instance of a class.

It is another object of the present invention to provide a method in a compiler for an object-oriented programming language in which virtual function table pointers can be shared between a derived class and a base class.

It is another object of the present invention to provide a compiler for an object-oriented programming language that reduces the number of adjusters needed for the virtual functions.

These and other objects of the invention, which will become more apparent as the invention is described more fully below, are obtained by providing an improved compiler for a programming language wherein the object data structure layouts for a class include a virtual function table pointer, a virtual base table pointer, occurrences of object data structures for non-virtual base classes, data members of the class, and object data structures for virtual base classes of the class, wherein associated with each class is a set of virtual function tables and virtual base tables that are shared by each instance of the class, and wherein adjusters adjust the this pointer when invoking a virtual function. In preferred embodiments of the present invention, a derived class that introduces a virtual function member and has a non-virtual base class with a virtual function table pointer, shares the virtual function table pointer of the first non-virtual base class encountered in a depth-first, left-to-right traversal of the inheritance tree. In preferred embodiments, the this pointer is set equal to the address of the virtual function table pointer for the class when the class has a virtual function table pointer, else the address of the virtual base table pointer when the class has a virtual base table pointer, else the this pointer of a non-virtual base class when the class has a non-virtual base class, else the address of a data member of the class.

DETAILED DESCRIPTION OF THE INVENTION

Figure 1:
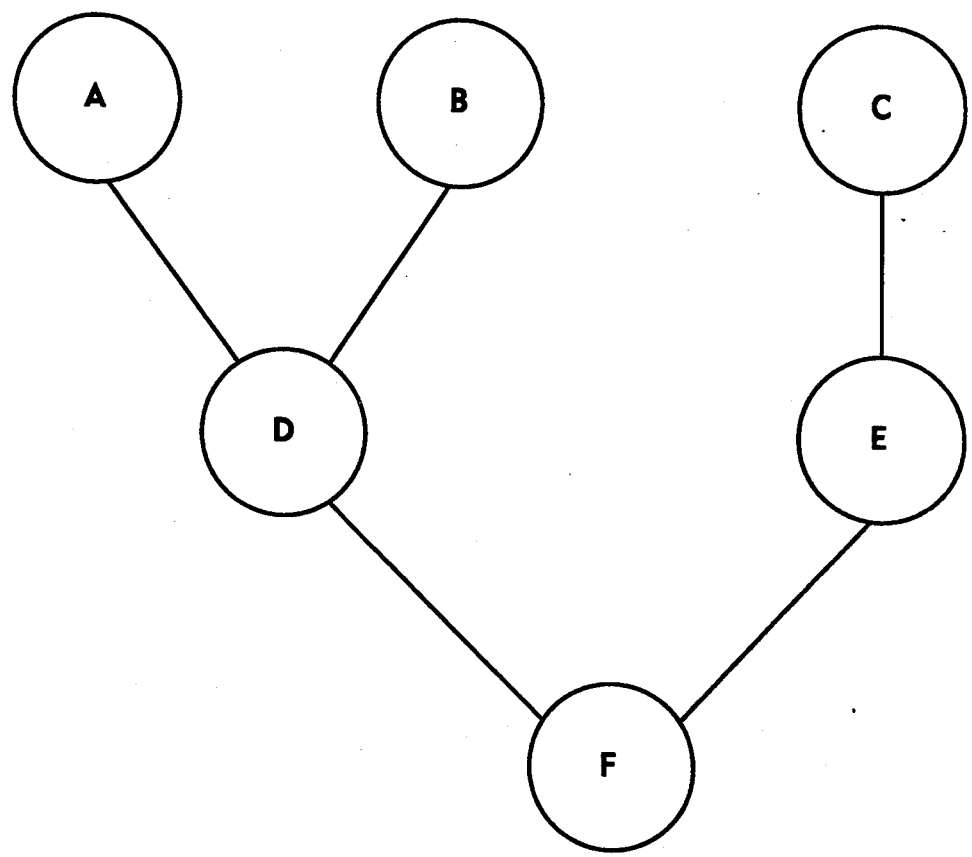
FIG. 1 shows the inheritance tree for class F.

The present invention provides an improved method and system for implementing the object-oriented techniques of virtual functions and virtual classes. A preferred embodiment of the present invention is C++ compiler that implements virtual functions and virtual classes as described herein. Although the present invention is described in terms of a compiler for the C++ programming language, one skilled in the art would know that the methods of the present invention are applicable to other programming languages that support virtual functions and virtual classes.

In a preferred embodiment, the compiler defines a data structure for each class. If a class declares a base class to be virtual, then the compiler allocates a virtual base table for the class. If a class introduces a virtual function, then the compiler allocates a virtual function table for the class. The class data structure contains the layout of the data members and internal pointers. The internal pointers are virtual base table pointers and virtual function table pointers. These pointers are initialized during run time to point to the virtual base table and virtual function table associated with the class. During compile time, the compiler initializes the virtual function tables with addresses corresponding to virtual functions and initializes the virtual base tables with offsets into the data structure corresponding to the location of the virtually inherited classes.

Data Structures

The compiler defines a data structure for each class. The data structure specifies the run-time storage allocation for each instance of the class. The data structure contains allocations for the data members of the class and for internal pointers used to implement virtual functions and virtual classes. The data structure for a derived class also contains the data structure for each base class. The data structure of a base class within a derived class is referred to as an occurrence of the base class within the derived class.

The data structure for a primary class that has no virtual function members consists of the data members allocated in order of appearance in the class declaration. In a preferred embodiment, the data members in any data structure have the same alignment characteristics as the C++ struct data type.

The data structure for a primary class that has a virtual function member consists of a virtual function table pointer followed by the data members allocated in order of appearance in the declaration.

The data structure for a derived class varies depending on the characteristics of the derived class and the base classes. In a preferred embodiment, the data structure for a derived class consists of:

(1) a virtual function table pointer, if the derived class defines a virtual function member that is not defined in a base class and if there is no non-virtual base class that has a virtual function table associated with it, (2) a virtual base table pointer, if there is a virtual base class and if there is no non-virtual base class that has a virtual base table pointer associated with that non-virtual base class, (3) an occurrence of each non-virtual base class in the left-to-right order specified in the list of base classes in the declaration, (4) the data members declared in the derived class allocated in order of appearance in the declaration, and (5) an occurrence of each virtual base class in the order as visited in a depth-first, left-to-right traversal of the inheritance tree (described below) of the derived class.

A derived class is a direct descendant of the base classes listed in the declaration. Conversely, the base classes listed in the declaration are direct ancestors of a derived class. An inheritance tree is the ancestral relationship of the direct and indirect ancestors of a class. FIG. 1 shows the inheritance tree for class F. Class F and its ancestor classes are defined below.

class A{ ... };

class B{ ... };

class C{ ... };

class D: A, B{ ... };

class E: C{ ... };

class F: D, E{ ... };

Class F directly descends from base classes D and E and indirectly descends from classes A, B, and C. Classes A, B, C, D, and E are base classes of class F. Classes D and E are direct base classes of class F. Classes A, B, and C are indirect base classes of class F. A depth-first, left-to-right traversal of this inheritance tree would visit the nodes in the following order: F, D, A, B, E, C. One skilled in the art would recognize that this traversal is a preorder traversal of the inheritance tree defined by the following recursive procedure.

```
Preorder_Traversal(Tree)
begin
    visit root of Tree
    for each direct ancestor of Tree in left-to-
        right order
        SubTree = the tree rooted at the direct
            ancestor
        call Preorder_Traversal(SubTree)
    end
```

Although preferred embodiments use a depth-first, left-to-right traversal of the inheritance tree, one skilled in the art would appreciate that other methods of traversing the inheritance tree may be used. Similarly, preferred embodiments scan the direct base class list in a left-to-right ordering. However, other orderings may be used.

Virtual Function Table

A virtual function table for a class contains addresses corresponding to the virtual function members associated with that class. The virtual function table is used at run time to invoke the virtual functions indirectly. Each primary class with a virtual function member has an associated virtual function table. The virtual function table contains the addresses of each virtual function member in order of declaration. The data structure for such a class contains a virtual function table pointer (vfptr). When memory for a data structure is allocated at run time, the virtual function table pointer is initialized with the address of the associated virtual function table. Thus, all objects of certain class type point to the same virtual function table. To implement the invoking of a virtual function, the compiler generates code to access the virtual function member through the virtual function table.

A derived class inherits a copy of the virtual function tables associated with its direct base classes. Also, a derived class that introduces a virtual function member either has an additional virtual function table or shares one of the inherited virtual function tables. A class is said to "introduce" a virtual function member if there are no other virtual function members of the same name and type in a base class. Such a derived class shares the virtual function table with the first non-virtual base class with an associated virtual function table that is visited in a depth-first, left-to-right traversal of the inheritance tree, if such a base class exists. Otherwise, the derived class has its own virtual function table. The derived class shares a virtual function table by appending the entries for the function members introduced in the derived class to the shared table.

In a preferred embodiment, the compiler generates code to invoke virtual functions indirectly through the virtual function table associated with the invoking object.

Virtual Base Tables

A virtual base table contains, for each virtual direct base class, the offset between the address of the derived class and the address of the occurrence of the virtual direct base class in the derived class. The address of a class is described below. The virtual base tables are used at run time to access the data members in virtual base classes.

The data structure for a derived class with an associated virtual direct base class includes a virtual base table pointer. Such a derived class shares the virtual base table pointer with the first non-virtual base class with an associated virtual base table that is visited in a depth-first, left-to-right traversal of the inheritance tree, if such a base class exists. The sharing of a virtual base table pointer means that the derived class and the base class share the same virtual base table. When a virtual base table is shared, the virtual base table is extended to include the offsets of the occurrences for the virtual direct base classes in the derived class that are not inherited by the base class whose virtual base table pointer is being shared. All functions that access the data members of a virtual base class access the data member through a virtual base table.

The entries in a virtual base table are ordered according to a left-to-right ordering of the virtual base classes in the declaration of the derived class.

Class Address

The address of an instance of a class is the address of the virtual function table pointer, if the class has one or shares one. Otherwise, the address of an instance of a class is the address of the virtual base table pointer, if the class has one or shares one. Otherwise, the address of an instance of a class is the address of the occurrence of the left-most non-virtual direct base class in the declaration, if there is such a base class. Otherwise, the address of an instance of a class is the address of the first data member in the class.

This Pointer

In the C++ language, the "this" pointer points to the object for which a function is called. The word "this" is a reserved word in the C++ language. In a preferred embodiment, the this pointer is passed to the function as hidden argument.

For non-virtual function members, the this pointer is the address of the object associated with the call.

For virtual function members, the this pointer is the address of the occurrence of the introducing class in the object associated with the call. A function defined in the introducing class expects that it is passed such a this pointer value. If the function is overridden, the overriding function may logically adjust the this pointer by the offset between the address of the object and the address of the occurrence of the introducing class within the object. This logical adjustment allows the overriding function to access the entire object of the class in which the overriding function is declared. In a preferred embodiment, explicit adjustment of the address may not be necessary because the offset can usually be incorporated into another computation or address formation.

Because an overriding function can be shared by many occurrences of a class or many different classes, there are two cases in which the this pointer needs to be adjusted before a function is invoked. In these cases, adjustor routines (i.e. thunks) are used to adjust the this pointer value before the function is invoked.

The first case occurs when a function member in a derived class overrides a function member that is defined in more than one base class, including when a class that defines the function occurs more than once in the inheritance tree. In this case, the overriding function is compiled expecting that the this pointer is set to the address of the "introducing class." The "introducing class" for a function is the first class visited in a depth-first, left-to-right traversal of the inheritance tree that introduces the function. For each class, except the introducing class, in which the function is overridden, an adjustor is created. The adjustor modifies the this pointer and then invokes the overriding function. The adjustor modifies the this pointer by the offset between the address of the occurrence of the introducing class and the address of the occurrence of the class for which the function is invoked. To override the address of the virtual function, the address of the adjustor is placed in the virtual function table corresponding to the occurrence of the class in which the function is defined. Thus, when the overriding function is invoked for an occurrence of a class for which an adjustor is created, the compiled program retrieves the address of the adjustor from the virtual function table and calls the adjustor. The adjustor then adjusts the this pointer and jumps to the overriding function. The virtual function table of the occurrence of the introducing class within the derived class contains the address of the overriding function, no adjustor is needed.

The second case occurs when a derived class has a base class that overrides a function member in a virtual base class and the derived class itself does not override the function member. In this case, the overriding function is compiled to expect the this pointer to be set to the address of the introducing class, the virtual class. To access an object for the class that virtually inherits the introducing class, the overriding function logically adjusts the this pointer by the offset of the occurrence of the introducing class and the address of the object. For the class that virtually inherits the introducing class, the address of the overriding function is placed in the virtual function table associated with the virtually inherited class. However, when such a class is itself used as a base class, the offset between occurrence of the virtual base class and the occurrence of the base class in the derived class may be different than the offset that the overriding function expects. In such case, an adjustor is used for the overriding function. The adjustor adjusts the this pointer to account for the difference between the offsets. The address of the adjustor is placed in the virtual function table associated with occurrence of the virtual class in the derived class. Thus, when the overriding function is called for an object of the derived class, the adjustor is invoked. The adjustor adjusts the this pointer by the difference in the offsets so that the overriding function correctly computes the address of the introducing class. The adjustor then invokes the overriding function.

Figure 2:
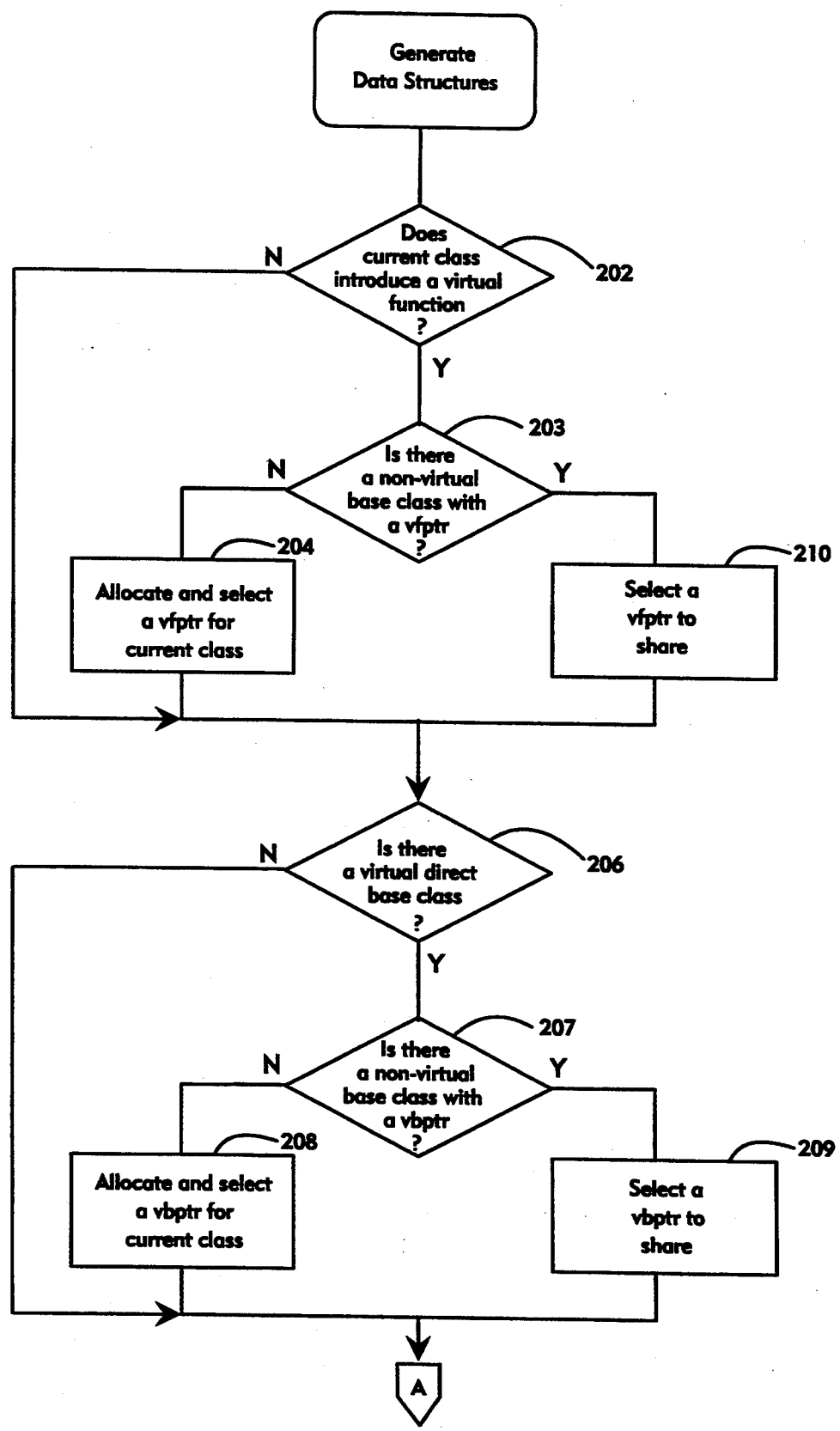
FIG. 2 shows a flow diagram of a method for generating a class data structure in a preferred embodiment.
Figure 2:
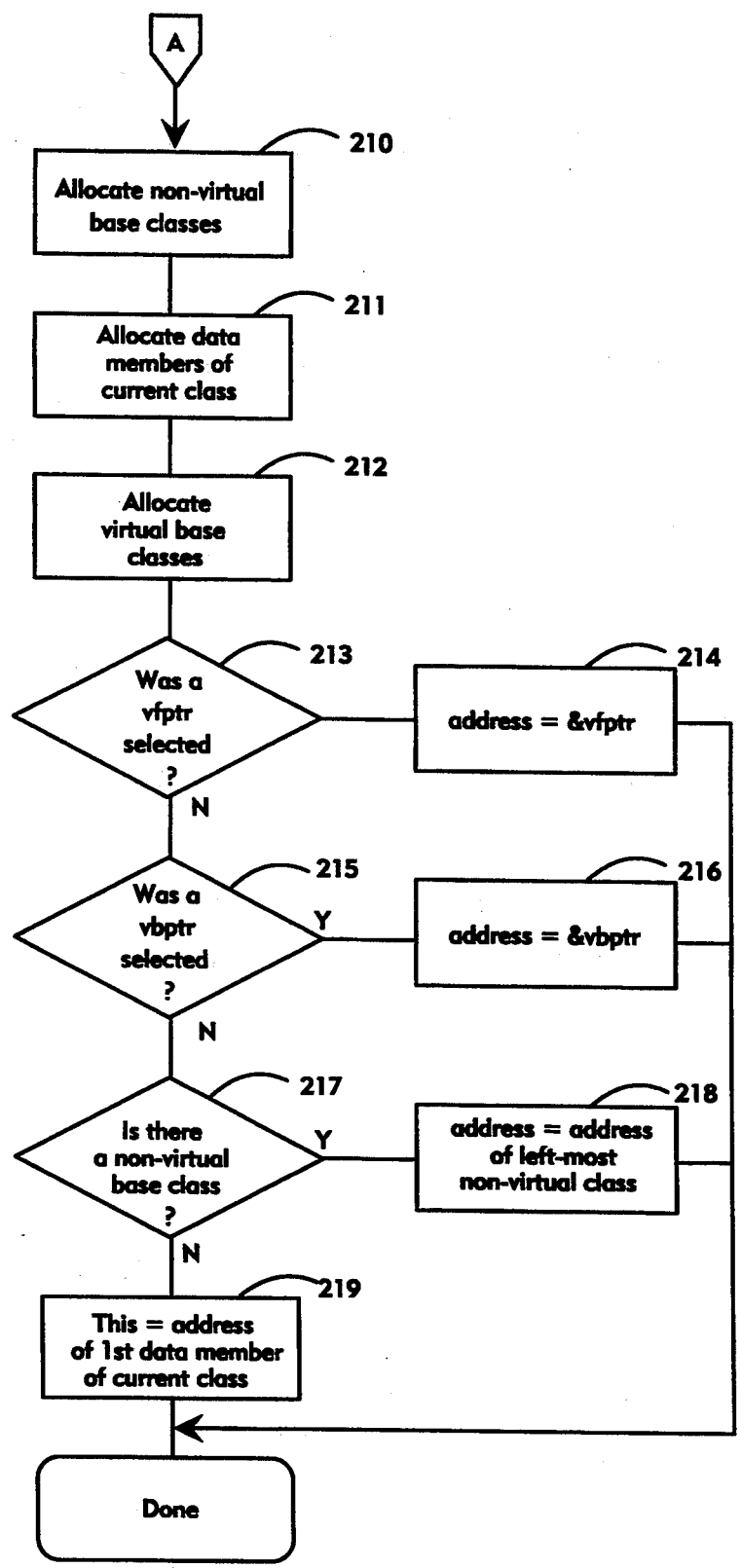
Figure 3:
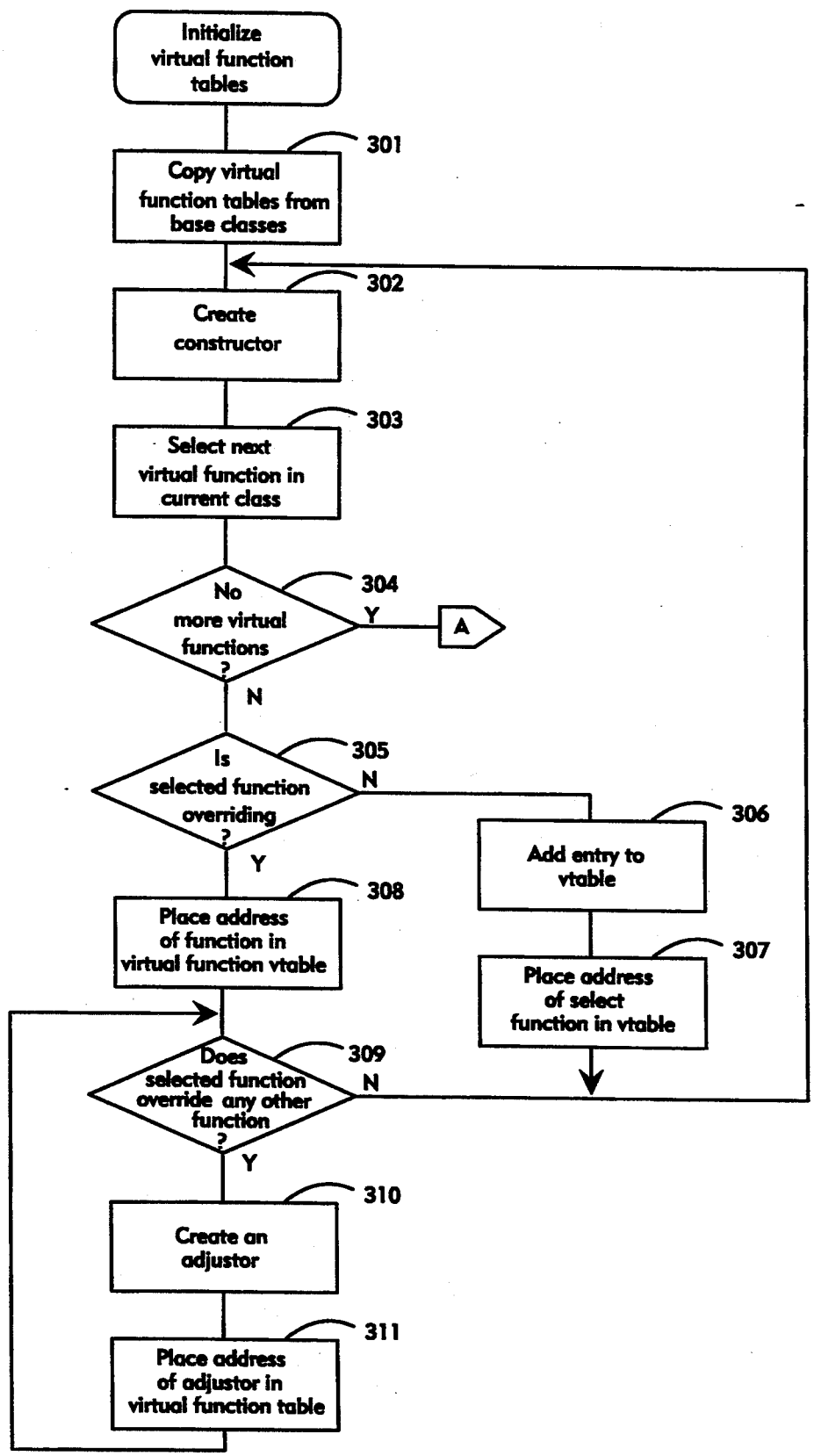
FIG. 3 is a flow diagram of a method for initializing the virtual function tables in a preferred embodiment.
Figure 3:
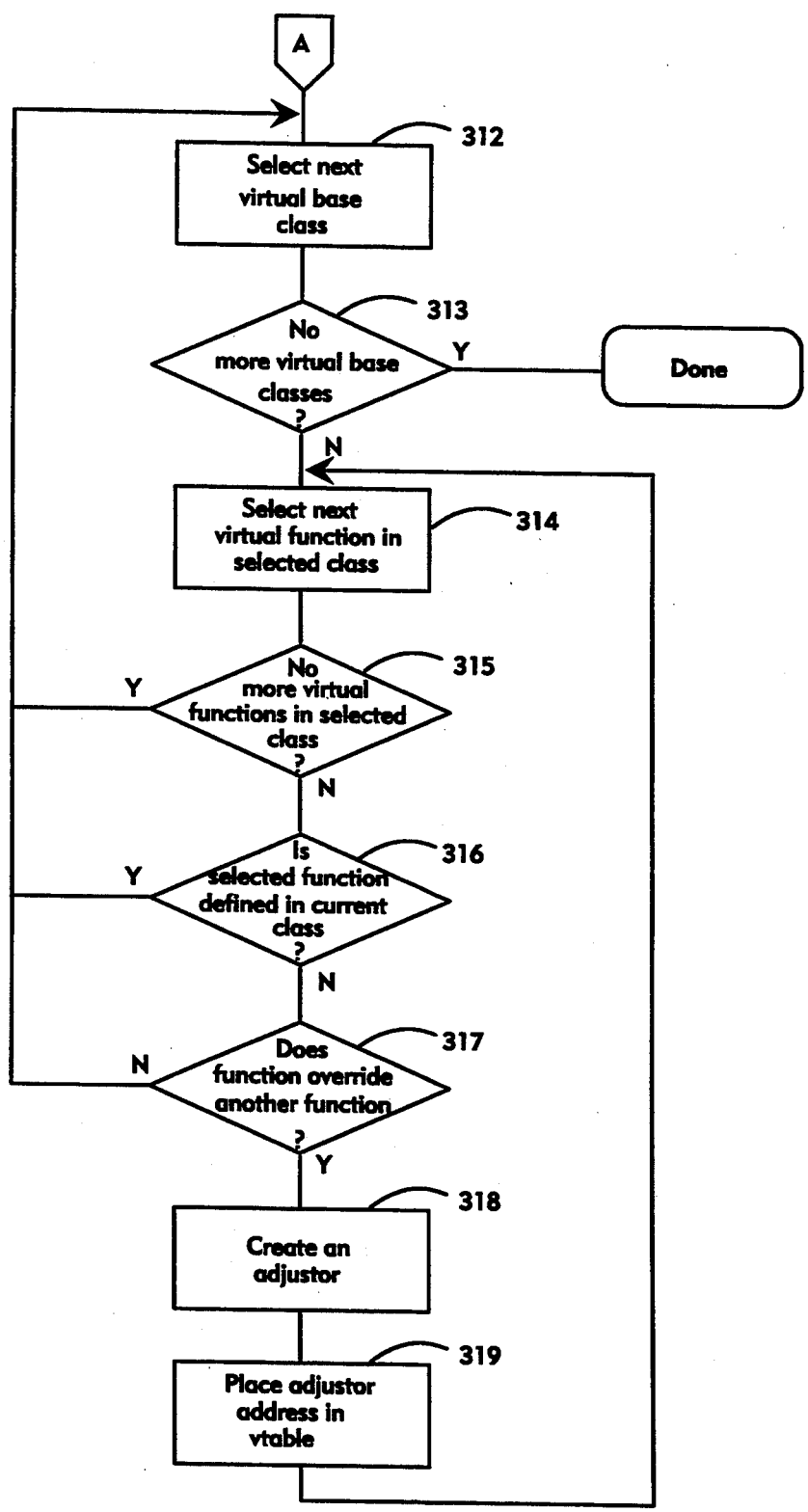

FIGS. 2 and 3 show a flow diagram of a preferred embodiment of the present invention. FIG. 2 shows a flow diagram of a method for generating a class data structure for the current class in a preferred embodiment. The "current class" refers the class declaration that the system is currently processing.

In block 202, if the current class introduces a virtual function, then the current class needs an associated virtual function table and the system continues at block 203, else the system jumps to block 206. In blocks 203 through 205, the system determines whether the current class will share the virtual function table of a base class and selects a virtual function table pointer for the current class. In block 203, if there is a non-virtual base class of the current class that has a virtual function table pointer, then the current class will share that virtual function table pointer and the system continues at block 205, else the current class will have its own virtual function table pointer and the system continues at block 204. In block 204, the system allocates a virtual function table pointer (vfptr) in the data structure for the current class and selects that pointer. In block 205, the system selects the virtual function table pointer associated with the first, non-virtual base class with an associated virtual function table pointer that is visited in a depth-first, left-to-right traversal of the inheritance tree. The current class will share the selected virtual function table pointer.

In blocks 206 through 209, the system determines whether the current class will share a virtual base table with a base class. In block 206, if the current class has a virtual direct base class, then the current class needs an associated virtual base table and the system continues at block 207, else the system jumps to 210. In block 207, if a non-virtual base class has an associated virtual base table pointer, then the current class shares a virtual base table and the system continues at block 209, else the system continues at block 208. In block 208, the system allocates a virtual base table pointer (vbptr) for the current class and selects the pointer. In block 209, the system selects the virtual base table pointer associated with the first, non-virtual base class with an associated virtual base table pointer that is visited in a depth-first, left-to-right traversal of the inheritance tree. The current class will share the selected virtual base table pointer.

In block 210, the system allocates in the data structure an occurrence of each non-virtual direct base class. The occurrences are allocated based on the left-to-right ordering in the declaration of the current class. In block 211, the system allocates the data members of the current class in the data structure, based on the order of declaration. In block 212, the system allocates an occurrence of each virtual base class in the data structure. The occurrences are allocated in the order as visited in a depth-first, left-to-right traversal of the inheritance tree. The system also generates a virtual base table, if the current class does not share one and there is a virtual direct base class. The system makes a copy of each virtual base table associated with the base classes. The system adjusts the entries in these virtual base tables to reflect the position of the occurrences of the virtual base classes relative to the address of the current class.

In blocks 213 through 219, the system determines the address of the current class. In block 213, if a virtual function table pointer was selected for the current class, then in block 214 the system sets address of the class equal to the offset of the selected virtual function table pointer in the class data structure, else the system continues at block 215. In block 215, if a virtual base table pointer was selected for the current class, then in block 216 the system sets the address of the current class equal to the offset of the selected virtual base table pointer in the class data structure, else the system continues at block 217. In block 217, if the current class has a non-virtual direct base class, then in block 218 the system sets the address of the current class equal to the offset of the occurrence of the left-most, non-virtual direct base class in the current class, else the system continues at block 219. In block 217, the system sets the address of the current class equal to the offset of the first data member in the current class data structure. Once the address for the current class is set, then the system initializes the virtual function tables for the current class.

FIG. 3 is a flow diagram of a method for initializing the virtual function tables in a preferred embodiment. In block 301, the system makes a copy of each virtual function table associated with the base classes of the current class. If a virtual base class has a virtual function table, the system copies the virtual function table from the left-most, direct base class that is derived from the virtual base class. If the current class introduces a virtual function and the current class does not share a virtual function table, then the system creates a virtual function table for the current class. In block 302, the system generates a constructor for the current class. The constructor is a function that is executed at run time whenever an instance of the current class is created. The constructor initializes the virtual function table pointers (vfptrs) in the class instance to point to the virtual function tables associated with the class and initializes the virtual base pointers (vbptrs) in the class instance to point to the virtual base tables associated with the current class.

In blocks 303 through 311, the system updates the virtual function tables to reflect that the current class introduces functions and has overriding functions. In block 303, the system selects the next virtual function (starting with the first) in the current class. In block 304, if there are no more virtual functions to select, then the system continues at block 312, else the system continues at block 305. In block 305, if the selected virtual function overrides a virtual function in a base class, then the system continues at block 308, else the system continues at block 306. In block 306, the system adds an entry to the virtual function table for the current class. In block 307, the system initializes the entry to contain the address of the selected function and loops to block 303.

In block 308, the system places the address of the selected function in the virtual function table of the introducing class so as to override the address of the overridden virtual function. In block 309, if the selected function overrides a function in an occurrence of a base class that has not yet been processed, then the system selects the occurrence and continues at block 310, else the system loops to block 303. The processing in blocks 310 and 311 corresponds to the first case, as described above, in which the this pointer needs to be adjusted. In block 310, the system creates an adjustor. The adjustor is a routine that is executed at run time. The adjustor adjusts the this pointer and jumps to the overriding function. The adjustor modifies the this pointer by the offset between the address of the occurrence of the introducing class and the address of the selected occurrence. In block 311, the system places the address of the adjustor in the virtual function table of the selected occurrence to override the address of the virtual function.

In blocks 312 through 319, the system overrides the virtual function table entries in base classes that have an overriding function member and that virtually inherit the introducing class, when the overriding function member is not declared in the current class. The methods described in blocks 312 through 319 correspond to the second case, as described above, in which an adjustor is needed. In block 312, the system selects the occurrence of the next virtual base class in the current class. In block 313, if there are no more virtual base classes to select, then the system is done, else the system continues at block 314. In block 314, the system selects the next virtual function in the selected occurrence. In block 315, if there are no more virtual functions in the selected occurrence, then the system loops to block 312, else the system continues at block 316. In block 316, if the selected function is declared in the current class, then no adjustor is needed and the system loops to block 312, else the system continues at block 317. In block 317, if the selected function is an overriding function, then an adjustor is needed and the system continues at block 318, else an adjustor is not needed and the system loops to block 312. In block 318, the system creates an adjustor. The adjustor adjusts the this pointer by the difference between the offset of the occurrence of the virtual base class and the occurrence of the base class of the current class in which the overriding function is declared and the offset the overriding function expects. In block 319, the system overrides the address of the selected function in the virtual function table associated with the selected occurrence with the address of the adjustor. The system then loops to block 314.

In the following, several examples of class declarations are presented along with the data structures, virtual function tables, and virtual base tables generated in a preferred embodiment of the present invention. Class A1 defined below is an example of a primary class with virtual functions.

```
class A1
    {       int ma11;
            int ma12;
            int fa10( );
    virtual int fa11( );
    virtual int fa12( );
    };
```

Figure 4:
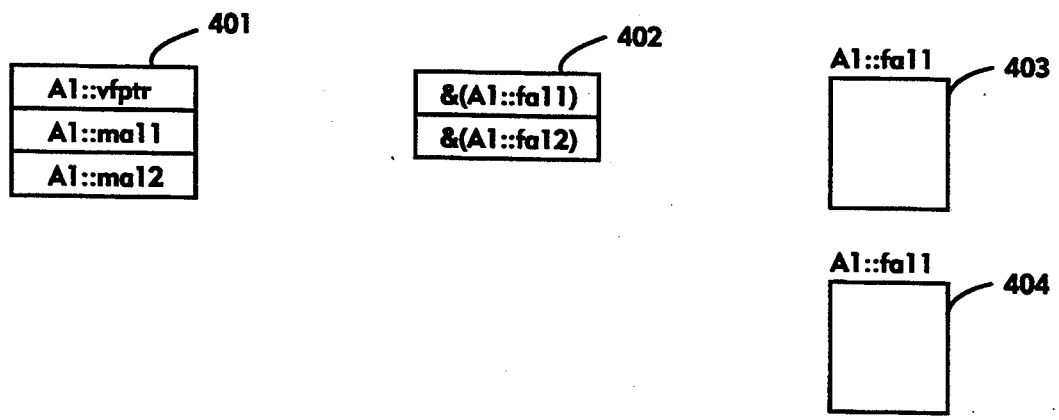
FIG. 4 is a schematic diagram of the data structure, the virtual function table, and the function members of class A1 that are generated in a preferred embodiment of the present invention.

FIG. 4 is a schematic diagram of the data structure 401, the virtual function table 402, and the function members 403, 404 of class A1 that are generated in a preferred embodiment of the present invention. The data structure 401 contains the virtual function table pointer A1::vfptr and the data members A1::ma11 and A1::ma12. The pointer A1::vfptr is an internal pointer that is used to access the virtual function members at run time. The virtual function table 402 contains the address of function A1::fa11 and the address of function A1::fa12.

Figure 5:
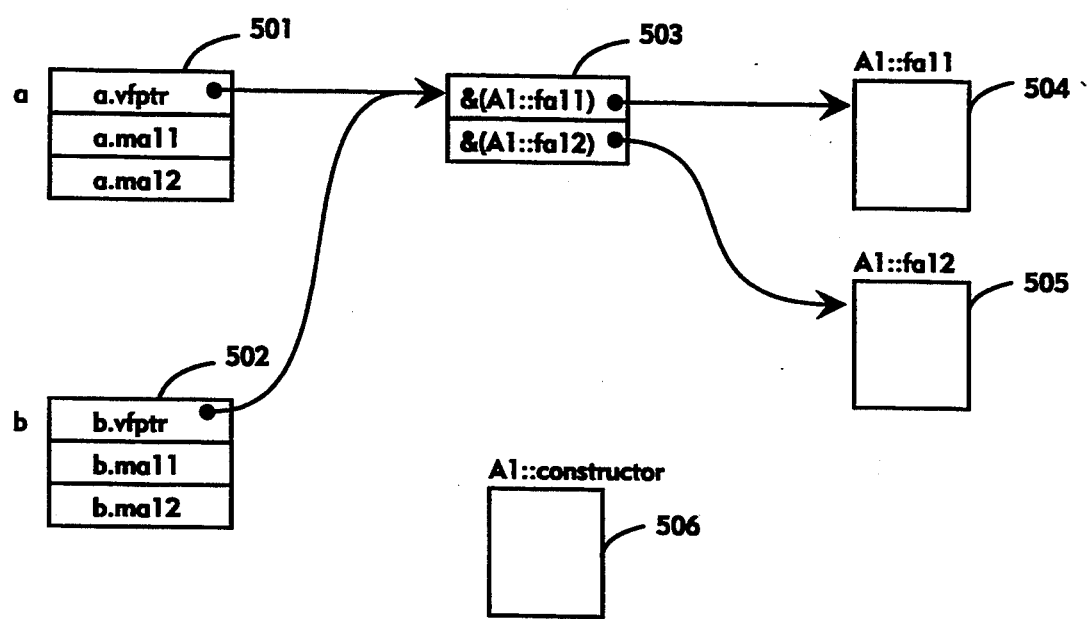
FIG. 5 is a schematic diagram of the run-time allocations of objects a and b of type class A1 in a preferred embodiment of the present invention.

FIG. 5 is a schematic diagram of the run-time allocations of objects a and b of type class A1 in a preferred embodiment of the present invention. During run time, the compiled program allocates object a 501 and object b 502 in accordance with the data structure 401 that is generated at compile time. The compiled program contains the virtual function table 503 for class A1. The compiler initializes the contents of the virtual function table 503 to contain the addresses of the virtual function members 504, 505 of class A1. Alternatively, the virtual function table 503 could be initialized either at run time or during subroutine linkage based on actual load address of the virtual function members 504 and 505. During run time, the compiled program invokes the constructor 506 for class A1 to initialize the data in object a 501 and object b 502. The constructor sets the pointer vfptr in each object to the address of the virtual function table 503 for class A1. All objects of type class A1 share the same virtual function table 503. The compiler generates code for the virtual function members A1::fa11 504 and A1::fa12 505 expecting that the this pointer is set to the address of the calling object. Whenever the compiler generates code to invoke the virtual function members 504, 505, the generated code accesses the virtual function members 504, 505 indirectly through the pointer vfptr of the calling objects. Thus, the statement b. fa12();

which invokes virtual function member A1::fa12 for object b 502, is logically equivalent to the following statement.

(*(b.vfptr[1])) ();

Class B1 defined below is an example of derived class with virtual function members and with base class A1. The virtual function member fa11 of class B1 overrides virtual function member fa11 of class A1.

```
class B1 : A1
    {       int mb11;
    virtual int fa11( );
    virtual int fb11( );
    virtual int fb12( );
    };
```

Figure 6:
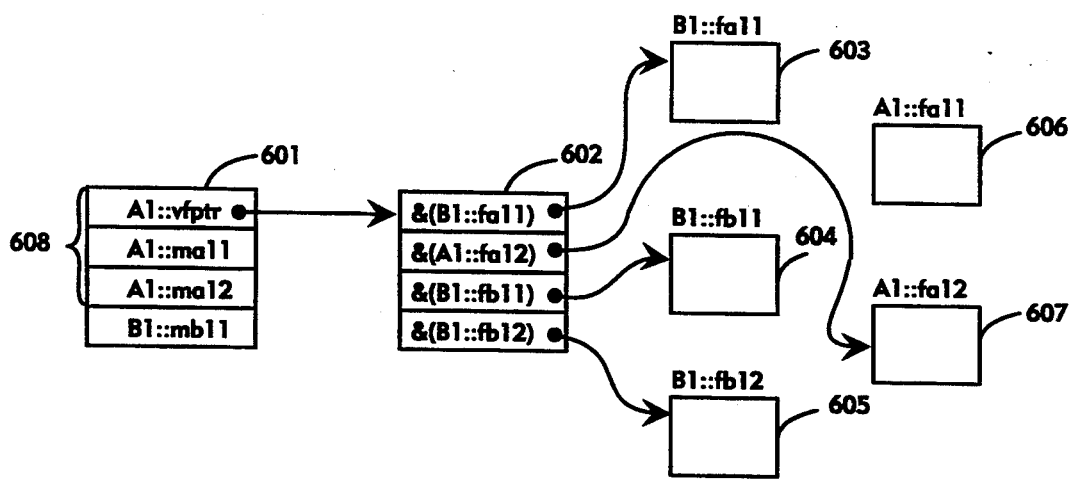
FIG. 6 is a schematic diagram of the data structure, the virtual function table, and the function members of class B1 that are generated in a preferred embodiment of the present invention.

FIG. 6 is a schematic diagram of the data structure 601, the virtual function table 602, and the function members 603, 604, 605, 607 of class B1 that are generated in a preferred embodiment of the present invention. The data structure 601 contains an occurrence 608 of the data structure of base class A1 and the data member B1::mb11 declared in class B1. Class B1 shares the virtual function pointer (A1::vfptr) of the occurrence 608 of class A1. The virtual function table 602 contains entries for the virtual function member 607 of class A1 and entries for the virtual function members 603, 604, 605 of class B1.

The first two entries of the virtual function table correspond to the virtual function members 606, 607 defined in class A1. However, the virtual function member fa11 606 of class A1 is overridden by the virtual function member 603 of the same name defined in class B1. Thus, the first entry of the virtual function table 602 contains the address of function B1::fa11 603, the overriding function. The virtual-function table 602 also contains the addresses of the virtual function members fb11 604 and fb12 605 that are introduced in class B1.

Class A2 defined below is an example of a primary class with no virtual function members.

```
class A2
{       int ma21;
        int ma22;
        int fa20( );
};
```

Figure 7:
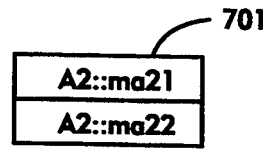
FIG. 7 is a schematic diagram of the data structure of class A2 that is generated in a preferred embodiment of the present invention.

FIG. 7 is a schematic diagram of the data structure of class A2 that is generated in a preferred embodiment of the present invention. The data structure 701 contains the data members ma21 and ma22 of class A2. Since there is no virtual function member, no virtual function table is needed. To invoke the function member fa20, the compiler generates code to invoke the function directly, rather than indirectly through a virtual function table.

Class B2 defined below is an example of a derived class with virtual function members and with no base class having virtual function members.

```
class B2 : A2
{       int mb21;
    virtual int fb21( );
    virtual int fb22( );
    virtual int fb23( );
};
```

Figure 8:
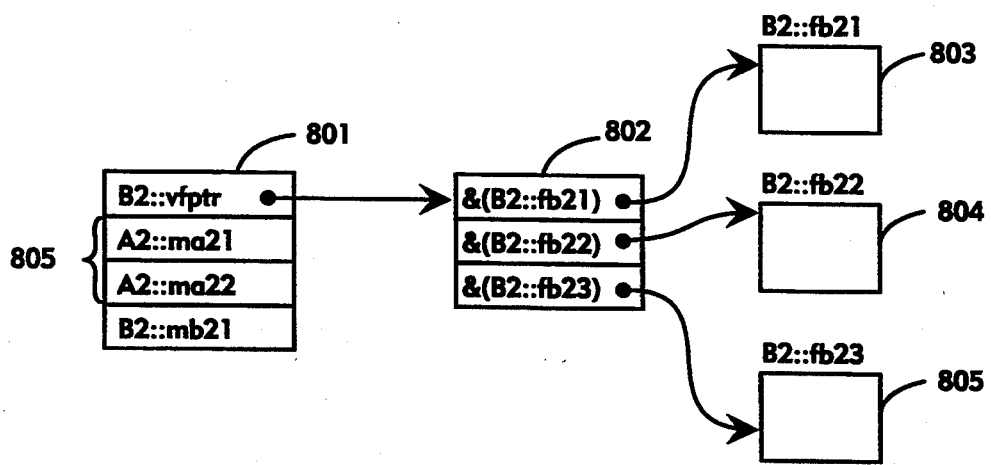
FIG. 8 is a schematic diagram of the data structure, the virtual function table, and the function members of class B2 that are generated in a preferred embodiment of the present invention.

FIG. 8 is a schematic diagram of the data structure 801, the virtual function table 802, and the function members 803, 804, 805 of class B2 that are generated in a preferred embodiment of the present invention. The data structure 801 contains the virtual function table pointer B2::vfptr for class B2, an occurrence of the data structure 805 of class A2, and the data member B2::mb21. Since class B2 has no non-virtual base class with a virtual table pointer, it has its own virtual table pointer (B2::vfptr). Class B2 also has its own virtual function table 802, which contains the addresses of the virtual function members 803, 804, 805 introduced in class B2.

Class A3 defined below is an example of a primary class with a non-virtual function member and virtual function members.

```
class A3
{       int ma31;
        int ma32;
        int fa30( );
    virtual int fa31( );
    virtual int fa32( );
};
```

Figure 9:
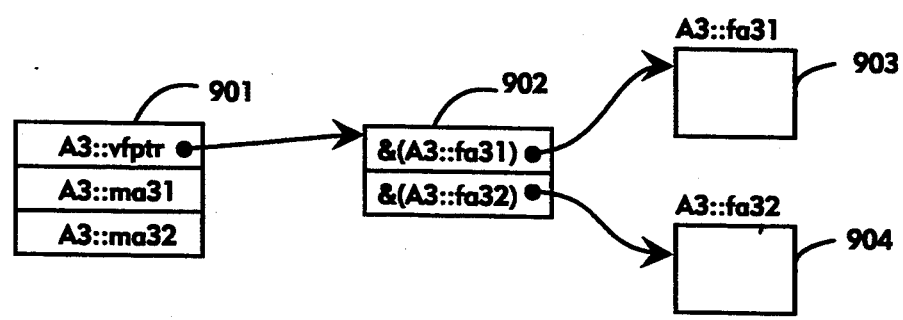
FIG. 9 is a schematic diagram of the data structure, the virtual function table, and the function members of class A3 that are generated in a preferred embodiment of the present invention.

FIG. 9 is a schematic diagram of the data structure 901, the virtual function table 902, and the function members 903, 904 of class A3 that are generated in a preferred embodiment of the present invention. The data structure 901 contains the virtual function table pointer A3::vfptr and data members A3::ma31 and A3::ma32. The virtual function table 902 contains the addresses of the virtual functions A3::fa31 903 and A3::fa32 904.

Class C1 defined below is an example of a derived class with two non-virtual base classes each having an associated virtual function table. The virtual function member fa11 of class C1 overrides the virtual function member fa11 of base class A1 and virtual function member fa32 of class C1 overrides the virtual function member fa32 of base class A3.

```
class C1 : A1, A3
{       int mc11;
        int mc12;
        int fc10( );
    virtual int fa11( );
    virtual int fa32( );
    virtual int fc11( );
};
```

Figure 10:
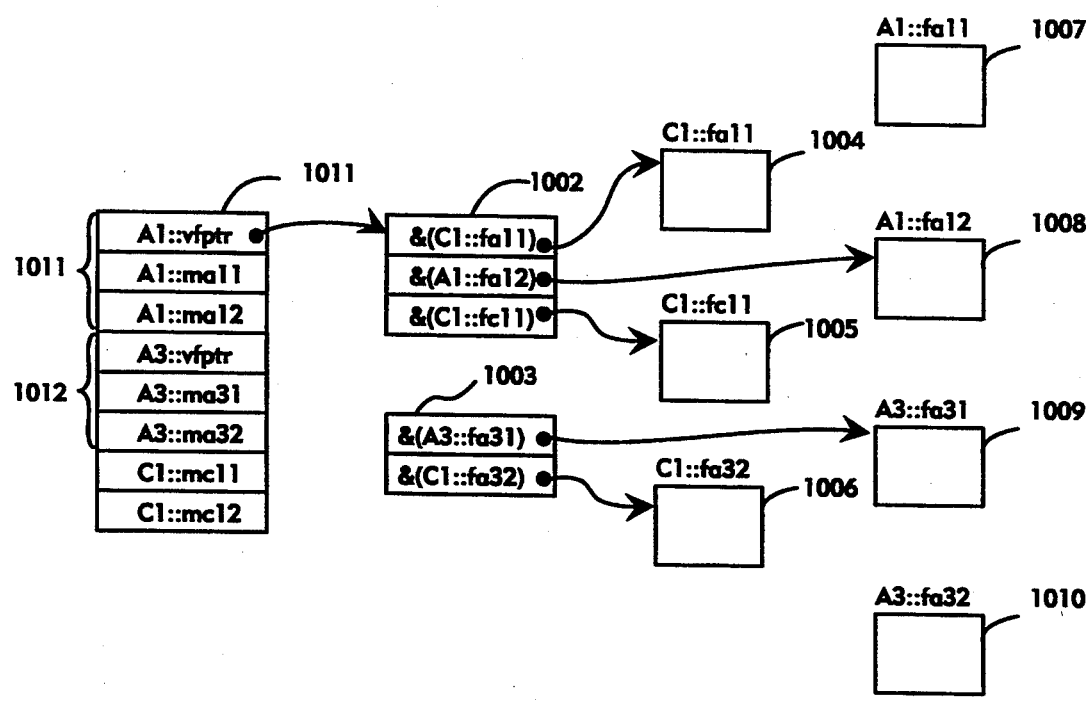
FIG. 10 is a schematic diagram of the data structure, the virtual function tables, and the function members of class C1 that are generated in a preferred embodiment of the present invention.

FIG. 10 is a schematic diagram of the data structure 1001, the virtual function tables 1002, 1003, and the function members 1004, 1005, 1006, 1008, 1009 of class C1 that are generated in a preferred embodiment of the present invention. The data structure 1001 contains an occurrence of the data structures 1011, 1012 for base classes A1 and A3 and the data members mc11 and mc12 of class C1. Because class C1 has a non-virtual base class that has a virtual function table pointer, class C1 shares the virtual function table pointer (A1::vfptr) with the left-most of such base class, that is, class A1. The compiler generates two virtual function tables 1002, 1003 for class C1. The virtual function table 1002 contains the addresses for the function members associated with class A1 and for the function members introduced by class C1. The other virtual function table 1003 contains the addresses of the virtual function members associated with class A3. The compiler initializes the virtual function table 1002 for classes A1 and C1 with the address of function C1::fa11 1004, which overrides function A1::fa11 1007, the address of function A1::fa12 1008, which is not overridden, and the address of function C1::fc11 1005, which is a virtual function introduced in class C1. The compiler initializes the virtual function table 1003 for class A3 with the addresses of the function A3::fa31 1009, which is not overridden, and the address of the function C1::fa32 1006, which overrides function A3::fa32 1010.

Class A4 defined below is an example of a primary class with a virtual function member that has the same name fa11 as a virtual function member of class A1.

```
class A4
{       int ma41;
        int ma42;
        int fa40( );
```

```
    -continued
    virtual int fa11( );
    virtual int fa42( );
};
```

Figure 11:
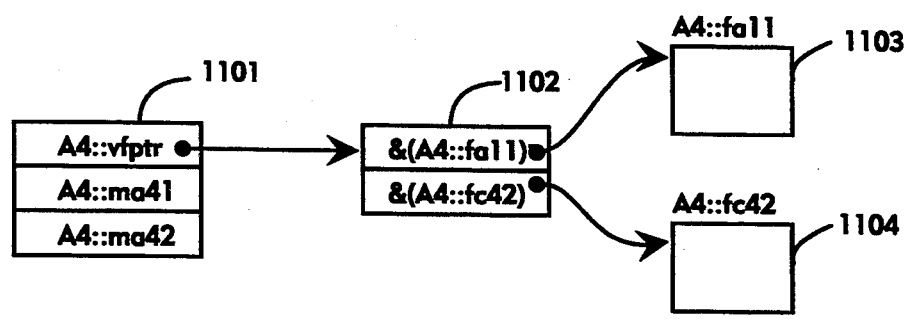
FIG. 11 is a schematic diagram of the data structure, the virtual function table, and the function members of class A4 that are generated in a preferred embodiment of the present invention.

FIG. 11 is a schematic diagram of the data structure 1101, the virtual function table 1102, and the function members 1103, 1104 of class A4 that are generated in a preferred embodiment of the present invention. The data structure 1101 contains the virtual function table pointer A4::vfptr and data members A4::ma41 and A4::ma42. The virtual function table 1102 contains the addresses of the virtual functions A4::fa11 1103 and A4::fa42 1104.

Class C0 defined below is an example of a derived class with a virtual function member that overrides a virtual function member in two different base classes. Base classes A1 and A4 each have a virtual function member named fa11. Class C0 also has a virtual function member named fa11, which overrides the corresponding function members in the base classes A1 and A4. Class C0 has virtual function member fa42, which overrides a virtual function member of class A4. Class C0 is an example of the first case, as described above, in which an adjustor is needed when a function member overrides a function member that is defined in more than one base class.

```
class C0 : A1, A4
{
            int mc01;
            int mc02;
            int fc00( );
    virtual int fa11( );
    virtual int fa42( );
    virtual int fc01( );
};
```

Figure 12:
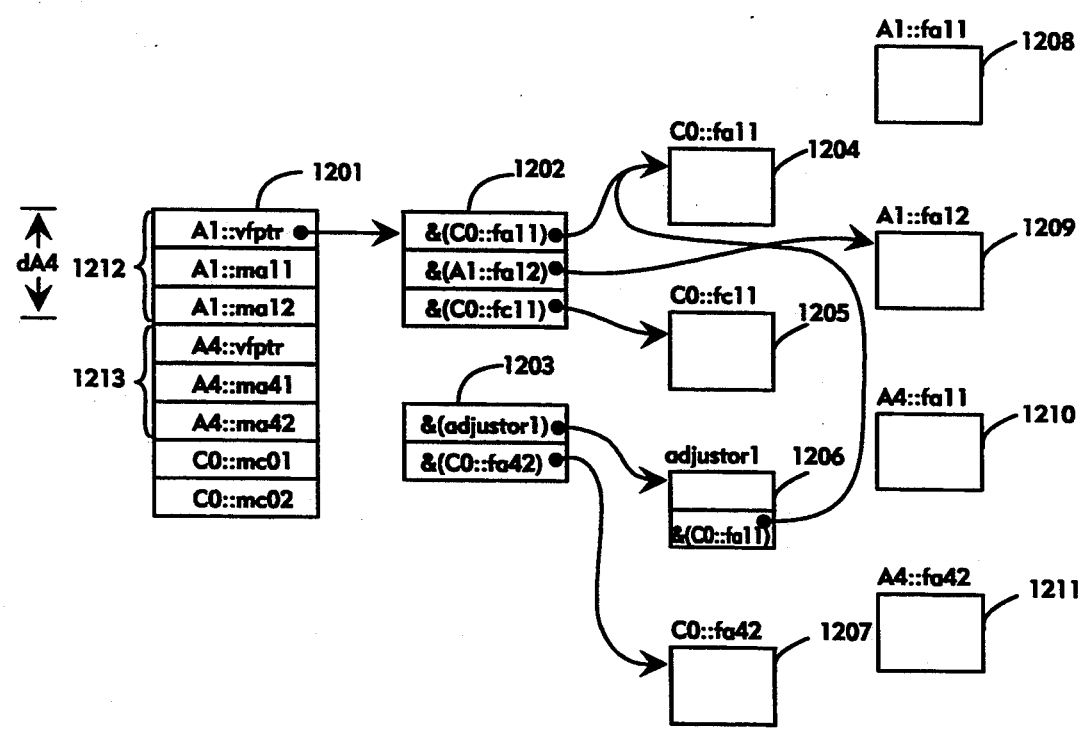
FIG. 12 is a schematic diagram of the data structure, the virtual function tables, and the function members of class C0 that are generated in a preferred embodiment of the present invention.

FIG. 12 is a schematic diagram of the data structure 1201, the virtual function tables 1202, 1203, and the function members 1204, 1205, 1207 of class C0 that are generated in a preferred embodiment of the present invention. The data structure 1201 and the virtual function tables 1202, 1203 are similar to those generated for class C1. The main difference is that virtual function fa11 overrides a function in two base classes. The virtual function table 1202 for classes A1 and C0 contains the address of the overriding virtual function C0::fa11. However, the virtual function table 1203 for the occurrence 1213 of class A4 contains the address of an adjustor 1206. The adjustor 1206 adjusts the this pointer and then jumps to function C0::fa11 1204.

The adjustor 1206 is needed because the function C0::fa11 1204 is compiled expecting that the this pointer, which is passed as a hidden argument, points to the address of a class C0 object. If function C0::fa11 1204 is invoked for an object of type class C0, then the this pointer points to the address of the object, which is the address of the shared virtual function table pointer A1::vfptr. This is the address that function C0:fa11 1204 expects. Similarly, if function C0::fa11 1204 in invoked for an object of type class A1 that has been type cast from an object of type class C0, then the this pointer contains the address of the occurrence 1212 of class A1 in an object of type class C0. This again is the address that function C0::fa11 1204 expects. However, if function C0::fa11 1204 is invoked for an object of type class A4 that has been type cast from an object of type class C0, then the this pointer contains the address of the occurrence 1213 of class A4 in an object of type class C0. Since function C0::fa11 1204 expects a different this pointer value, the adjustor 1206 is used to adjust the this pointer from the address of the occurrence 1213 of class A4 to the address of class C0. This adjustment is known at compile time. Thus, the compiler generates the following code for the adjustor 1206.

this − =dA4;
go to C0::fa11;

The constant dA4 represents the difference between the address of class C0 and the address of the occurrence 1213 of class A4 in class C0.

Conversely, no adjustor is needed for function C0::fa42 1207, which is invoked through the virtual function table 1203 associated with the occurrence 1213 of class A4 in class C0. The function C0::fa42 1207 is compiled expecting that the this pointer points to the address of the occurrence 1213 class A4 in class C0. Whenever the compiler generates a call to function C0::fa42 1207 for an object of type class C0, the compiler sets the this pointer to the address of the occurrence 1213 of class A4 in class C0. If function C0::fa42 1207 is invoked with an object of type class A4 that is type cast from an object of class C0, then the compiler sets the this pointer equal to the address of the occurrence 1213 of class A4. This is the address that function C0::fa42 1207 expects. Again, no adjustor is needed. Functions A1::fa11 1208, A4::fa11 1210, and A4::fa42 1211 are overridden by the functions declared in class C0.

Class C2 defined below is an example of a derived class with multiple occurrences of class A1 in the inheritance tree. Class C2 has function fa12, which overrides the function of the same name in both occurrences of class A1. Class C2 is another example of the first case, as described above, in which an adjustor is needed when a function member overrides a function member that is defined in more than one base class, in this example two occurrences of the same class type.

```
class C2 : B1, A1
{
            int mc21;
            int mc22;
            int fc20( );
    virtual int fa12( );
    virtual int fc21( );
    virtual int fc22( );
};
```

Figure 13:
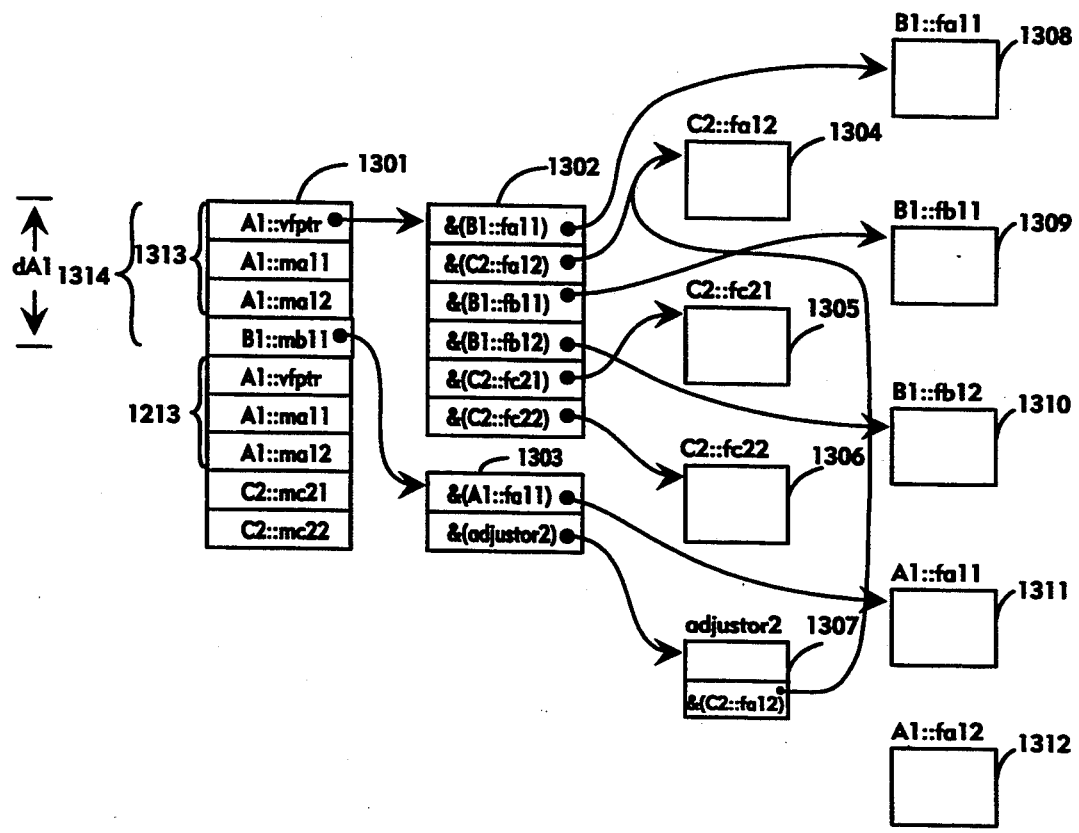
FIG. 13 is a schematic diagram of the data structure, the virtual function tables, and the function members of class C2 that are generated in a preferred embodiment of the present invention.

FIG. 13 is a schematic of the data structure 1301, the virtual function tables 1302, 1303, and the function members 1304, 1305, 1306 of class C2 that are generated in a preferred embodiment of the present invention. The data structure 1301 contains an occurrence 1314 of class B1, an occurrence 1315 of class A1, and the data members mc21 and mc22 of class C2. The occurrence 1314 of class B1 contains an occurrence 1313 of class A1. Thus, there are two occurrences 1313, 1315 of class A1 within the data structure 1301 for class C2. The virtual function pointer B1::A1::vfptr and the associated virtual function table 1302 are shared by class C2, by the occurrence 1314 of class B1, and by the occurrence 1313 of class A1 derived through class B1. That virtual function table 1302 contains the addresses of the virtual functions 1304, 1305, 1306, 1308, 1309, 1310 defined in classes A1, B1, and C2. The virtual function member A1::fa12 1312 is overridden by virtual function member C2::fa12 1304. However, the virtual function table 1303 for the occurrence 1315 of class A1 that is directly inherited contains the address of an adjustor 1307, rather than the address of the overriding function C2::fa12 1304. The adjustor 1367 adjusts the this pointer and then jumps to function C2::fa12 1304.

The adjustor 1307 is needed because the function C2::fa12 1304 is compiled expecting that the this pointer, which is passed as a hidden argument, contains the address of a class C2 object. If function C2::fa12 1304 is invoked for an object of type class C2, then the this pointer contains the address of class C2, which is the address of the shared virtual function table pointer C1::B1::A1::vfptr. This is the this pointer value that function C2::fa12 1304 expects. Similarly, if function C2::fa12 1304 is invoked for an object of type class B1 that has been type cast from an object of type class C2 or for an object of type class A1 that has been type cast from an occurrence of class B1 in an object of type class C2, then the this pointer contains the address of the occurrence of class B1 or occurrence of class A1 in class B1. This again is the this pointer value that function C2::fa12 1304 expects. However, if function C2::fa12 1304 is invoked for an object of type class A1 that has been type cast directly from an object of class C2, which is the occurrence 1315 of class A1 in class C2 that is inherited directly, then the this pointer contains the address of the second occurrence 1315 of class A1 in an object of type class C2. But function C2::fa12 1304 expects a different this pointer value. The adjustor 1307 is used to adjust the this pointer value from the address of the second occurrence 1315 of class A1 to the address of class C2. This adjustment value is static and known at compile time. Thus, the compiler generates the following adjustor.

```
this— =dA1;

goto C2::fa12;
```

The constant dA1 represents the difference between the address of class C2 and the address of the second occurrence 1315 of class A1 in class C2.

Class B3 defined below is an example of a derived class that virtually inherits base class A1. Class B3 also has a virtual function B3::fa11 that overrides a virtual function member of class A1.

```
class B3 : virtual A1
{       int mb31;
    virtual int fa11( );
    virtual int fb31( );
    virtual int fb32( );
};
```

Figure 14:
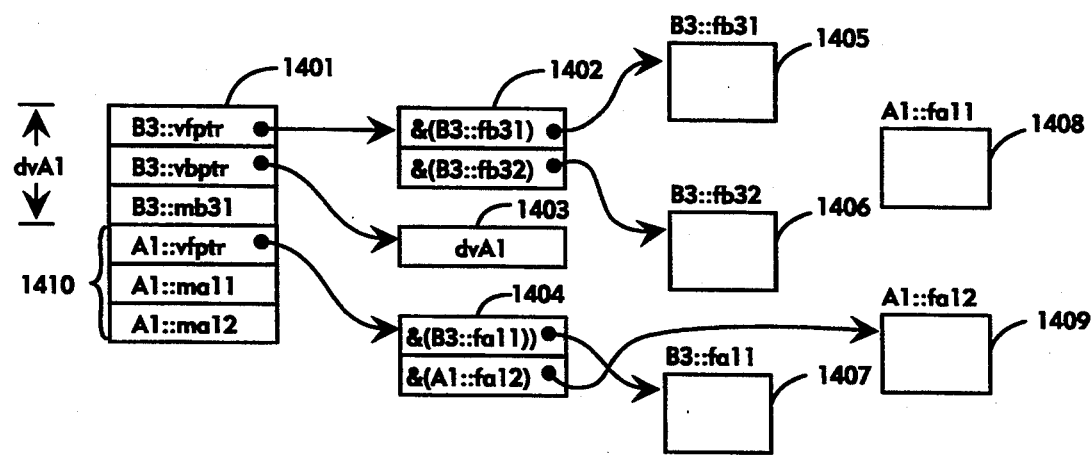
FIG. 14 is a schematic diagram of the data structure, the virtual function tables, the virtual base table, and the function members of class B3 that are generated in a preferred embodiment of the present invention.

FIG. 14 is a schematic diagram of the data structure 1401, the virtual function tables 1402, 1404, the virtual base table 1403, and the function members 1405, 1406, 1407 of class B3 in a preferred embodiment of the present invention. The data structure 1401 contains the virtual function table pointer B3::vfptr and the virtual base table pointer B3::vbptr for class B3, the data member B3::mb31 for class B3, and an occurrence 1410 of the data structure for virtual base class A1. Class B3 does not share the virtual function table pointer with base class A1 because base class A1 is virtually inherited. Because class B3 does not share a virtual function table, the compiler generates a class B3 virtual function table 1402 for class B3. The occurrence 1410 of class A1 also has its own virtual function table 1404. Since virtual function member B3::fa11 1407 overrides virtual function member A1::fa11 1408, the compiler stores the address of the overriding function B3::fa11 1407 in the virtual function table 1404 for class A1. The virtual function table 1404 for class A1 also contains the address of function A1::fa12 1409, which is not overridden. The virtual base table 1403 contains the offset of the occurrence 1410 of class A1 in class B3, which is a constant that is known at compile time. Functions B3::fa11 1407, B3::fb31 1405, and B3::fb32 1406, are compiled to access the occurrence 1410 of class A1 in class B3 through the virtual base table 1403. Although function B3::fa11 1407 could be compiled to access the occurrence 1410 of class A1 in class B3 based on the this pointer, if class B3 is inherited by another class (case two as described above), the adjusted this pointer does not point to the virtual function pointer for class A1.

Class C3 defined below is an example of a derived class that virtually inherits class A1 twice. Class C3 inherits class A1 directly because it is a direct base class and indirectly because it is a virtual base class of direct base class B3. Virtual function member C3::fa12 overrides a function in class A1, and virtual function member C3::fb32 overrides a function in class B3.

```
class C3 : virtual A1, B3
{       int mc31;
        int mc32;
    virtual int fa12( );
    virtual int fb32( );
    virtual int fc31( );
};
```

Figure 15:
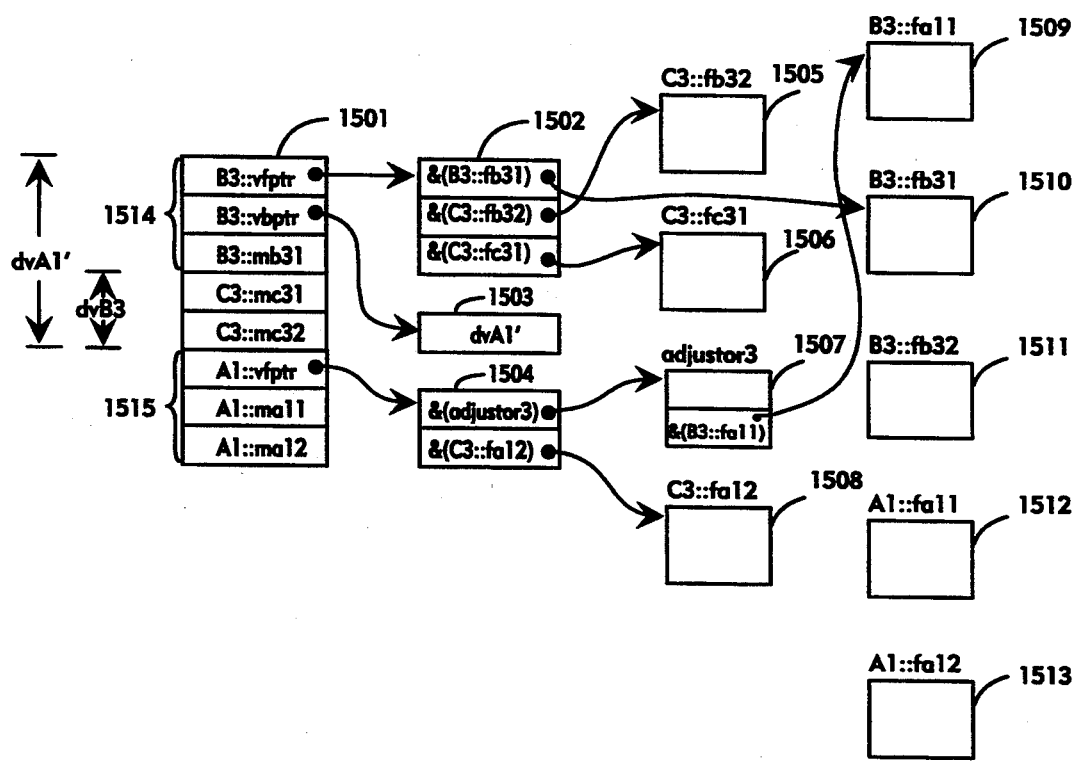
FIG. 15 is a schematic diagram of the data structure, the virtual function tables, the virtual base table, and the virtual function members of class C3 that are generated in a preferred embodiment of the present invention.

FIG. 15 is a schematic diagram of the data structure 1501, the virtual function tables 1502, 1504, the virtual base table 1503, and the virtual function members 1505, 1506, 1508 of class C3 in a preferred embodiment of the present invention. The data structure 1501 contains an occurrence 1514 of the data structure of class B3, the data members mc31 and mc32 of class C3, and an occurrence 1515 of the data structure of virtual class A1. Since class A1 is virtually inherited, the data structure 1501 contains only one occurrence 1515 of class A1. Since class B3 is a non-virtual class with a virtual function table pointer, class C3 shares the virtual function table pointer B3::vfptr and the virtual function table 1502 of class B3. Virtual function C3::fb32 1505 overrides the function B3::fb32 1511 introduced in class B3. Also, the virtual function table 1502 for class C3 and B3 contains the address of function C3::fc31 1506, which is introduced in class C3. The virtual function table 1504 for the occurrence 1515 of class A1 contains two entries. The second entry is the address of virtual function C3::fa12 1508, which is defined in class C3 and overrides function A1::fa12 1513 defined in class A1. Function C3::fa12 1508 is compiled expecting that the this pointer contains the address of the occurrence 1515 of class A1 within an object of type class C3. Function C3::fa12 1508 determines the address of the class C3 object in which class A1 object occurs by subtracting the constant dvA1', which is known at compile time, from the this pointer. Function C3::fa12 1508 accesses the data members in the occurrence 1515 of class A1 through the virtual base table. The first entry of the virtual function table 1504 for the occurrence 1515 of class A1 contains the address of an adjustor 1507. As discussed above, function B3::fa11 1509 is compiled expecting the this pointer to be the address of the occurrence 1515 of class A1. Function B3::fa11 1509 also expects that the address of the class B3 object to be the constant distance dvA1 (not dvA1'), as shown in FIG.

14, from the value in the this pointer. However, the occurrence 1515 of class A1 in class C3 is different constant difference from the occurrence of class B3 in class C3. Thus, the compiler generates the following adjustor.

```
this-=dvB3 go to B3::fa11
```

The constant dvB3 represents the difference. between dvA1 and dvA140. Function B3::fa11 1509 adjusts the this pointer by the constant dvA1 to determine the address of the occurrence of class B3. Thus, the adjustor associated with the class C3 object adjusts the this pointer by dvB3, which leaves the adjusted this pointer value such that when the function B3::fa11 1509 subtracts the constant dvA1 it arrives at the correct address of the occurrence of class B3 within class C3. Since function B3::fa11 1509 is compiled to access the occurrence of class A1 through a virtual base table, the function works correctly with the adjusted this pointer. The virtual base table 1503 contains the offset (dvA2′) of the occurrence 1515 of class A1 in class C3.

Although the methods and systems of the present invention have been disclosed and described herein primarily with respect to preferred embodiments designed to be used in a compiler for a C++ programming language, the invention is not intended to be limited by such embodiments. Rather, the present invention is intended to include all legally equivalent embodiments including those designed for use with other programming languages which implement virtual functions or virtual base classes.

What is claimed is:

1. A method in a computer compiler for a programming language for generating an object data structure layout and object address for a class, the class defined in terms of base classes, data members, and function members, each base class defined as either virtual on non-virtual, each function member defined as either virtual or non-virtual, wherein each class that introduces a virtual function member has an associated virtual function table and a virtual function table pointer, wherein each class with a virtual direct base class has an associated virtual base table and a virtual base table pointer, the method comprising the computer-implemented steps of:
   when the class introduces a virtual function member,
     when the class has a non-virtual base class with a virtual function table pointer, selecting a non-virtual base class with a virtual function table pointer so that the class shares the virtual function table and the virtual function table pointer of an occurrence of the selected class within the class, and selecting the virtual function table pointer of the selected base class, and
     when the class does not have a non-virtual base class with a virtual function table pointer, allocating a virtual function table pointer in the object data structure layout and a virtual function table, and selecting the allocated virtual function table pointer;
   when the class has a virtual direct base class,
     when the class has a non-virtual base class with a virtual base table pointer, selecting a non-virtual base class with a virtual base table pointer so that the class shares the virtual base table and the virtual base table pointer of an occurrence of the selected class within the class, and selecting the virtual base table pointer of the selected base class, and
     when the class does not have a non-virtual base class with a virtual base table pointer, allocating a virtual base table pointer in the object data structure layout and a virtual base table, and selecting the allocated virtual base table pointer;
   allocating space in the object data structure layout for an occurence of each non-virtual base class of the class;
   allocating space in the object data structure layout for each data member of the class;
   allocating space in the object data structure layout for an occurence of each virtual base class of the class;
   when a virtual function table pointer is selected, setting the object address equal to the address of the selected virtual function table pointer; and
   when a virtual function table pointer is not selected,
     when a virtual base table pointer is selected, setting the object address equal to the address of the selected virtual base table pointer, and
     when a virtual base table pointer is not selected,
       when the class has a non-virtual base class, setting the object address equal to the address of a non-virtual base class, and
       when the class does not have a non-virtual base class, setting the object address equal to the address of a data member of the class.

2. The method of claim 1 wherein an inheritance tree defines the ancestral relationship among the base classes and the class, and wherein the step of selecting a non-virtual base class with a virtual function table pointer includes selecting the first such base class visited in a depth-first, left-to-right traversal of the inheritance tree of the class.

3. The method of claim 1 wherein an inheritance tree defines the ancestral relationship among the base classes and the class, and wherein the step of selecting a non-virtual base class with a virtual base table pointer includes selecting the first such base class visited in a depth-first, left-to-right traversal of the inheritance tree of the class.

4. A method in a computer system for generating an object data structure for a class, the class defined in terms of a base class, data member, and function member, each base class defined as either virtual or non-virtual, each function member defined as either virtual or non-virtual, the method comprising the computer-implemented steps of:
   when the class introduces a virtual function member,
     when an object data structure of a non-virtual base class contains a virtual function table pointer, allocating space for the virtual function table pointer within the space allocated to the non-virtual base class, wherein the virtual function table pointer for the class is shared with the virtual function table pointer of the non-virtual base class; and
     when no object data structure of a non-virtual base class contains a virtual function table pointer, allocating space for the virtual function table pointer for the class, wherein the virtual function table pointer for the class is not shared with any base class;
   when the class inherits a virtual base class, allocating space for a virtual base table pointer for pointing to a virtual base table for the class, the virtual base table having a reference to a virtual base class of the class;

for each non-virtual base class of the class, allocating space for the non-virtual base class;

for each data member of the class, allocating space for the data member; and for each virtual base class of the class, allocating space for the virtual base class.

5. The method of claim 4 wherein the class has an inheritance tree, wherein when more than one non-virtual base class has an object data structure that contains a virtual function table pointer, sharing the virtual function table pointer of the first non-virtual base class visited in a depth-first, left-to-right traversal of the inheritance tree of the class as the virtual function table pointer for the class.

6. The method as recited in claim 4 wherein the step of allocating space for a virtual base table pointer further includes the steps of:

when an object data structure of a non-virtual base class contains a virtual base table pointer, allocating space for the virtual base table pointer within the space allocated to the non-virtual base class, wherein the virtual base table pointer for the class is shared with the virtual base table pointer of the non-virtual base class; and when no object data structure of a non-virtual base class contains a virtual base table pointer, allocating space for the virtual base table pointer for the class, wherein the virtual base table pointer for the class is not shared with any base class.

7. The method of claim 6 wherein the class has an inheritance tree, wherein when more than one non-virtual base class has an object data structure that contains a virtual base table pointer, sharing the virtual base table pointer of the first non-virtual base class visited in a depth first, left-to-right traversal of the inheritance tree of the class as the virtual base table pointer for the class.

8. A method in a computer system for generating an object data structure for a class, the class defined in terms of a base class, data member, and function member, each base class defined as either virtual or non-virtual, each function member defined as either virtual or non-virtual, the method comprising the computer-implemented steps of:

when the class introduces a virtual function member, allocating space for a virtual function table pointer for pointing to a virtual function table for the class, the virtual function table having a reference to a virtual function member of the class;

when the class inherits a virtual base class, when an object data structure of a non-virtual base class contains a virtual base table pointer, allocating space for the virtual base table pointer within the space allocated to the non-virtual base class, wherein the virtual base table pointer for the class is shared with the virtual base table pointer of the non-virtual base; and when no object data structure of a non-virtual base class contains a virtual base table pointer, allocating space for the virtual base table pointer for the class, wherein the virtual base table pointer for the class is not shared with any base class;

for each non-virtual base class of the class, allocating space for the non-virtual base class;

for each data member of the class, allocating space for the data member; and for each virtual base class of the class, allocating space for the virtual base class.

9. The method as recited in claim 8 wherein the step of allocating space for a virtual function table pointer further includes the steps of:

when an object data structure of a non-virtual function class contains a virtual function table pointer, allocating space for the virtual function table pointer within the space allocated to the non-virtual function class, wherein the virtual function table pointer for the class is shared with the virtual function table pointer of the non-virtual function; and when no object data structure of a non-virtual function class contains a virtual function table pointer, allocating space for the virtual function table pointer for the class, wherein the virtual function table pointer for the class is not shared with any function class.

10. The method of claim 9 wherein the class has an inheritance tree, wherein when more than one non-virtual base class has an object data structure that contains a virtual function table pointer, sharing the virtual function table pointer of the first non-virtual base class visited in a depth-first, left-to-right traversal of the inheritance tree of the class as the virtual function table pointer for the class.

11. The method of claim 8 wherein the class has an inheritance tree, wherein when more than one non-virtual base class has an object data structure that contains a virtual base table pointer, sharing the virtual base table pointer of the first non-virtual base class visited in a depth first, left-to-right traversal of the inheritance tree of the class as the virtual base table pointer for the class.

* * * * *